United States Patent [19]
Paulsen

[11] Patent Number: 5,215,761
[45] Date of Patent: Jun. 1, 1993

[54] APPARATUS FOR PRODUCTION OF LONGITUDINAL MULTI-COMPONENT FRAME ELEMENT

[75] Inventor: Hans-Dieter Paulsen, Zwingenberg, Fed. Rep. of Germany

[73] Assignee: Masco Industries, Inc., Taylor, Mich.

[21] Appl. No.: 779,501

[22] Filed: Oct. 18, 1991

Related U.S. Application Data

[63] Continuation of Ser. No. 448,276, Dec. 11, 1989, Pat. No. 5,104,597.

[30] Foreign Application Priority Data

Dec. 12, 1988 [DE] Fed. Rep. of Germany ....... 3841798
May 30, 1989 [DE] Fed. Rep. of Germany ....... 3917491

[51] Int. Cl.$^5$ .............................................. B29C 39/10
[52] U.S. Cl. ............................... 425/111; 425/117; 425/128; 425/589; 425/817 R; 249/96; 249/153
[58] Field of Search ............... 425/111, 117, 127, 128, 425/817 R, 123, DIG. 44, 589, 590, 555; 264/46.5, 46.7, 261, 313, 339; 249/83, 96, 153, 127, 82, 173

[56] References Cited

U.S. PATENT DOCUMENTS

| | | | |
|---|---|---|---|
| 1,991,470 | 2/1935 | Smithers | 425/395 |
| 2,010,669 | 8/1935 | Hopkin | 264/295 |
| 3,789,102 | 1/1974 | Hazelett, Jr. | 264/295 |
| 3,875,280 | 4/1975 | Story | 264/313 |
| 3,889,353 | 6/1975 | Provi | 29/458 |
| 4,208,365 | 6/1980 | LeFevre | 425/808 |
| 4,381,908 | 5/1983 | Roth | 425/192 R |
| 4,460,423 | 7/1984 | Bosnia | 425/117 |
| 4,468,190 | 8/1984 | Witte | 425/DIG. 44 |
| 4,481,701 | 11/1984 | Hewitt | 264/295 |
| 4,613,475 | 9/1986 | Hettinga | 425/589 |

FOREIGN PATENT DOCUMENTS 223625 5/1987 European Pat. Off.
3442909 5/1984 Fed. Rep. of Germany.

OTHER PUBLICATIONS

Patent Abstracts of Japan, vol. 10, NR. 193 (M-496) 2249, Jun. 8, 1986 JP-A-61 37 518 (Kojima Press).

*Primary Examiner*—Jay H. Woo
*Assistant Examiner*—Khanh P. Nguyen
*Attorney, Agent, or Firm*—Wenderoth, Lind & Ponack

[57] ABSTRACT

An apparatus for producing a longitudinal multi-component frame element includes a longitudinal mold within which is positioning at least one longitudinal member to form a first component of the frame element. A second component of the frame element is formed by introducing into the mold a foamable and curable material such as polyurethane which cures to form a rigid plastic component connected to the longitudinal member. Before formation of the rigid plastic component, the longitudinal mold is bent in a direction opposite to a direction of anticipated warping of the frame element that would be caused by internal stresses therein. Thus, the frame element initially is formed within the mold to be of a bent configuration, and after removal of the frame element from the mold, the internal stresses transform such initial bent configuration into a straight or rectilinear configuration.

5 Claims, 2 Drawing Sheets

APPARATUS FOR PRODUCTION OF LONGITUDINAL MULTI-COMPONENT FRAME ELEMENT

This is a continuation application of Ser. No. 07/448,276, filed Dec. 11, 1989, now U.S. Pat. No. 5,104,597.

BACKGROUND OF THE INVENTION

The present invention relates to an apparatus for production of a longitudinal multicomponent frame element, for example to be used in forming a frame for a window or door, more particularly, to such a frame element of the type including at least one longitudinal member, for example formed of a plastic material, wood or metal, for example aluminum, in various forms such as sheet metal or extruded metal, with a rigid plastic core component connected to such member in a positive, rigid or non-positive manner.

Frame elements of this general type normally are produced in lengths of up to approximately six meters. At least one longitudinal member, for example two such longitudinal members to form opposite outer side portions of the frame element, and formed, for example, of aluminum are positioned within a longitudinal mold. There then is injected into the mold to fill the remaining cavity thereof a foamable and curable material such as polyurethane. This material cures to form a rigid plastic component connected to the longitudinal member or members. Such a frame element is disclosed in German DE-PS 32 42 909.

It is a prerequisite for the use of this type of frame element that the frame element not be warped in the longitudinal and transverse directions, i.e. have substantially perfect longitudinal dimensions. However, this is difficult to achieve in practice, particularly when the frame element and the components thereof are not symmetrical when viewed in transverse cross section. Particularly, during foaming and curing, the rigid plastic foam becomes connected positively and non-positively to the inner surfaces of the longitudinal members, for example extruded aluminum members. Furthermore, outer walls of the plastic member not adjacent the aluminum members cure more densely than the inner core or center zone of the rigid plastic component. During foaming temperatures ranging from 120° C. to 180° C. are produced in the center core zone, depending on the course of the involved reaction and the relative dimensions involved. When cooling to room temperature, internal stresses are generated within the frame element. These stresses result from the factors of temperature differential, reaction loss of the plastic material, and varying coefficients of expansion of the metal members, the outer more dense plastic zones and the inner or core less dense plastic zone. Accordingly, when the frame element is removed from the mold, particularly when the frame element has an asymmetrical cross section, such internal stresses will result in warping of the frame element. That is, when the axes of masses of the various components, taken in the longitudinal direction, do not coincide, then warping of the frame element will occur. This problem also results when the longitudinal side members of the frame element are formed of a material other than metal, for example wood or plastic.

In the manufacture of this type of frame element, it is customary to first determine the functional design features of the frame element, i.e. the dimensions and transverse configuration thereof. Normally the longitudinal axes of mass of the plastic material in the core zone and/or in the outer zones will deviate from the longitudinal axes of mass of the metal (or other material) side members. To avoid warping of the frame element, it has been necessary in the past to attempt to make such longitudinal axes coincident. This is normally done by extensive mathematical and design simulation exercises by computer, for example varying wall thicknesses of the outer longitudinal members or by altering shapes thereof. When coincidence of the longitudinal axes has been achieved mathematically, then the resulting data are converted into actual production. Thus, to achieve a non-warping property of a particular frame element it may be necessary to use a thicker wall dimension or modify the shape of at least on of the outer wall members. Since such outer members normally are formed of a more expensive material, such as extruded aluminum, wood or plastic, the need to use additional such material to achieve coincidence of the axes increases the cost of the finished product. Additionally of course, such computerized mathematical simulation itself is expensive.

Such known techniques suffer from certain additional inherent disadvantages. Thus, the equilibrium between the longitudinal axes of masses of the various components, although once determined in the above manner, can be imbalanced or destroyed by production deviations of the wall thicknesses of the outer members during production thereof, thereby inevitably again resulting in warping of the finished product. Such deviations can occur due to wear of the various parts employed in tools for manufacture of the outer members, for example wear of extrusion dies in the case of extruded aluminum members.

Furthermore, in the above conventional arrangement it is not possible to replace one or more of the outer members with a different material, for example other metals such as copper or other materials such as wood or plastic, without disturbing the equilibrium of coincidence of the axes thereof. That is, when there becomes a change in the materials, there also will be changes of coefficients of expansion. Similarly, any changes in wall thickness or configuration of the outer members similarly will result in lack of coincidence of the axes. Yet further, it is not possible in such known system to employ outer members formed by conventional rolling techniques, due to the expense in sufficiently accurately controlling wall thicknesses thereof to ensure coincidence of the axes. Thus, changes of wall thickness of the outer members can, as indicated above, shift the axes out of coincidence.

SUMMARY OF THE INVENTION

With the above discussion in mind, it is an object of the present invention to provide an apparatus for production of a longitudinal multi-component frame element, whereby such element that can be produced without warping thereof.

It is a further object of the present invention to provide such an apparatus for the production of such a longitudinal multi-component frame element whereby it is possible to avoid the above and other prior art disadvantages.

It is a more specific object of the present invention to provide such an apparatus whereby it is possible to avoid warping or bending of the frame element even if the longitudinal axes of the masses of the various components of the element do not coincide.

It is a yet further specific object of the present invention to provide such an apparatus whereby it is not necessary to give any consideration to the cross-sectional configuration or shape of the element in total or of the various components thereof, or of the type of material employed for the longitudinal outer members.

These objects are achieved in accordance with the present invention by the provision that the longitudinal mold is bent in a direction opposite to the direction of anticipated warping of the frame element. Therefore, when the foamable and curable material is introduced into the mold and cures therein to form a rigid plastic component connected to the longitudinal member or members previously positioned within the mold, the result is that the frame element is formed within the mold to be of a bent configuration. Thereafter, when such frame element is removed from the mold, the internal stresses within the frame element still occur and cause the frame element to bend upon cooling or final curing of the frame element. However, this bending or warping is compensated by the bent configuration with which the frame element initially is provided. Thus, the warping that occurs due to the internal stresses is employed to cause the original bent configuration of the frame element to be transformed to a straight or rectilinear and non-warped configuration.

In accordance with the above feature of the present invention it is possible to manufacture frame elements without curvature or warpage thereof, even while employing various components of different materials and with non-coincident longitudinal axes of mass. It therefore is possible to totally dispense with mathematical simulation operations that were necessary in the prior art to produce equilibrium of such axes. In accordance with the present invention, the necessary degree of bending of the longitudinal mold to result in a final product of rectilinear configuration can be determined simply by empirical methods. Obviously, a process employing the apparatus of the present invention can be conducted totally independently of the particular materials, surface profiles or cross-sectional configurations of the various components of the frame element, as well as independently of any deviations of the shapes and thicknesses of the walls of the components. Accordingly, in accordance with the present invention it is possible to employ components that are prepared by known and relatively inexpensive rolling techniques.

The apparatus of the present invention provides that the mold can be bent approximately in the center thereof since this normally would be the point of maximum warpage of the frame element. The degree of bending readily can be adjusted by various known techniques. In one preferred arrangement of the present invention, the opposite ends of the longitudinal mold are mounted in a manner to be pivotable about such ends but not to be movable in transverse directions. A bending force may be applied to the mold, for example at the center thereof, by suitable means, for example a piston cylinder unit or a screw spindle unit.

The longitudinal multi-component frame element produced by the apparatus the present invention, particularly suitable for use in forming a frame for a window or a door, may include longitudinal members formed from a variety of materials, for example sheet metal, extruded metal, for example aluminum, wood or plastic materials. Such longitudinal members may have a wide variety of shapes and cross-sectional configurations. Such longitudinal member or members become connected, positively or non-positively, to the common solid core of the frame element that is formed by foaming and curing of a plastic material, such as polyurethane. The longitudinal axes of mass of the various components of the frame element do not need to be coincident, but nevertheless the frame element has a true rectilinear configuration without warping or bending. This is possible without regard to the materials of the components or the configurations thereof including wall thicknesses of the longitudinal members.

BRIEF DESCRIPTION OF THE DRAWINGS

Other objects, features and advantages of the present invention will be apparent from the following detailed description of preferred features thereof, with reference to the accompanying drawings, wherein.

DETAILED DESCRIPTION OF THE INVENTION

Figure 5:
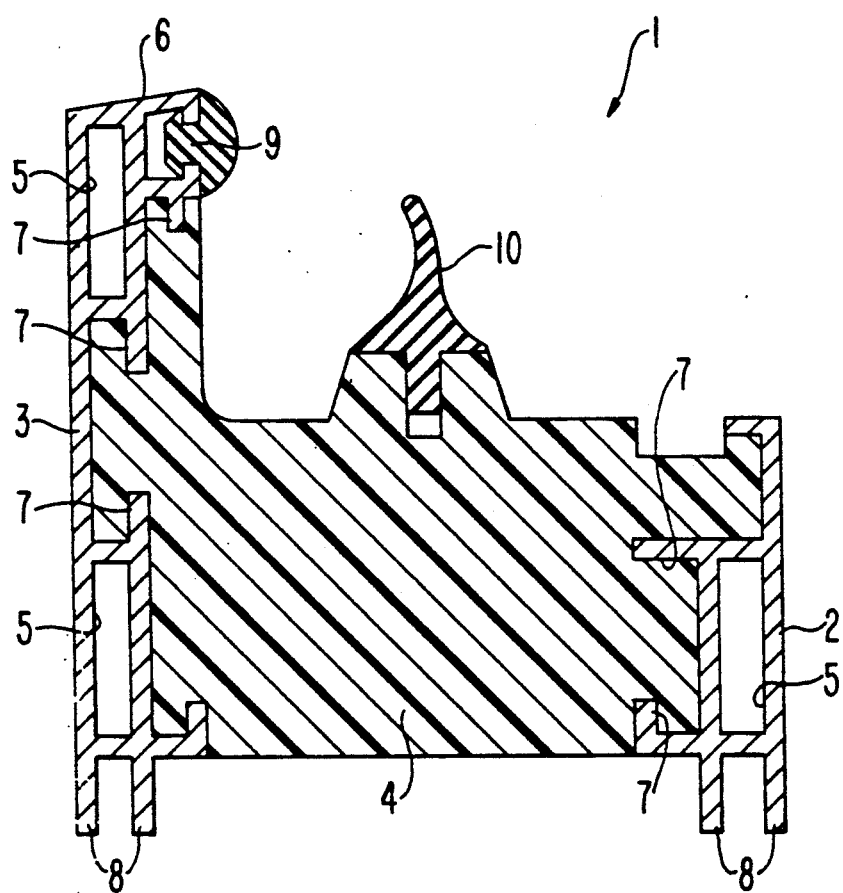
FIG. 5 is an enlarged cross-sectional view of such frame element in accordance with the present invention.

In FIG. 5 is illustrated one possible embodiment of a longitudinal multi-component frame element in accordance with the present invention, for example to be used in forming a frame for a window or a door. The frame element 1 includes two longitudinal members 2, 3 forming opposite sides of the frame element. In this illustrated arrangement, longitudinal members 2, 3 are extruded metal members. The frame element also includes a center core 4 of foamed polyurethane. To anchor or connect core 4 to members 2, 3 such members are provided with various projections 7 that are embedded within the material of core 4. To achieve connection of the frame element to a building structure, such as a brick wall, members 2, 3 have extensions 8. As illustrated the frame element 1 has an angular configuration, i.e. member 2 has a height dimension substantially smaller than member 3. Member 3 is provided at its upper end with a groove 6 receiving a sealing strip 9. The upper center region of core 4 also has a groove receiving a sealing strip 10. Members 2, 3 also are provided with cavities 5, for example to be employed for receipt of corner connectors. Cavities 5 are not filled with the foamed polyurethane material of core 4.

The frame element 1 shown in FIG. 5 is employed, as indicated above, for various uses such as frames for windows or doors. It is of course absolutely necessary to be able to produce frame elements 1 to be of an accurately rectilinear configuration without warpage.

Figure 1:
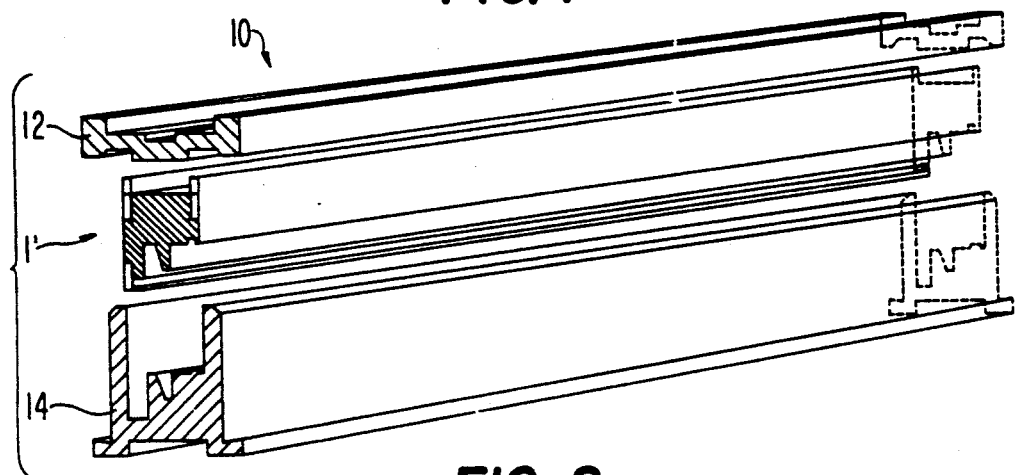
FIG. 1 is an exploded perspective view of a longitudinal mold and a frame element produced thereby in accordance with the prior art.
Figure 2:
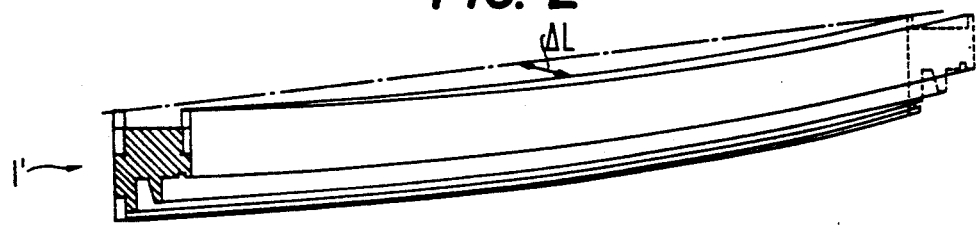
FIG. 2 is a perspective view of a finished frame element produced in accordance therewith, indicating resultant warpage.

The frame element is produced conventionally by a longitudinal mold 10 illustrated in FIG. 1 and including upper mold member 12 and lower mold member 14. Conventionally, the longitudinal members 2, 3 are positioned within mold member 14, mold member 12 then closes the mold, and then a suitable foamable and curable material such as polyurethane is introduced into the mold to fill the cavity therein. During curing the foamed material forms core 4 and is connected to the longitudinal members 2, 3 to produce a frame element 1'. However, for various of the reasons discussed above it is possible that internal stresses within the frame element 1' will cause warping or bending of the frame element 1'. This warpage is indicated by ΔL in FIG. 2. Such warpage is a result of the various factors discussed above, and generally is due to the asymmetrical configuration of the frame member and will occur unless the prior art systems involving complicated mathematical simulation are carried out previously to ensure coincidence of the longitudinal axes of mass of the various components of the frame element.

Figure 3:
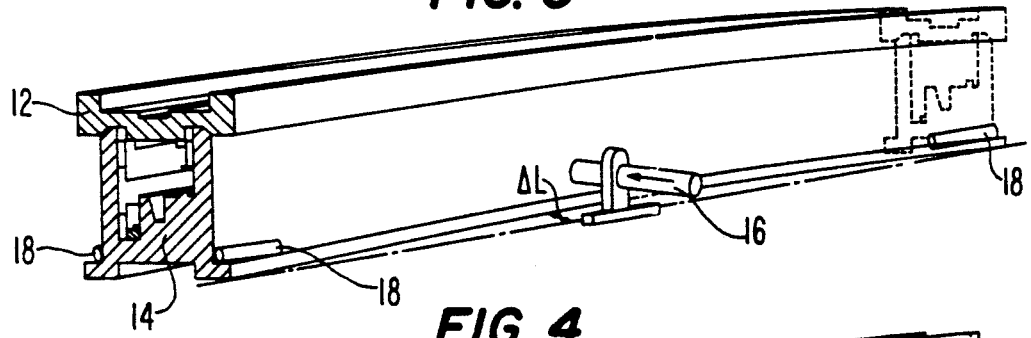
FIG. 3 is a perspective view of the longitudinal mold of FIG. 1 in an assembled position and with longitudinal members positioned therein, but being bent in accordance with the present invention to avoid warpage of the finished frame element.

In accordance with the present invention however, as illustrated in FIG. 3, prior to or during foaming of the material of core 4, the longitudinal mold is bent in a direction opposite to the anticipated direction of warpage of the frame element. This bending is indicated by an amount ΔL in FIG. 3 and is achieved by a suitable pressure device 16, for example a piston-cylinder unit or a screw spindle unit. The opposite ends of the mold can be mounted, for example by elements 18 shown schematically in FIG. 3, to allow pivoting or hinging of the ends of the mold without movement in the transverse directions thereof. Thus, when the force is applied by device 16, the mold will be deflected at its center portion by the amount ΔL.

Figure 4:
FIG. 4 is a perspective view of the finished, non-warped frame element produced thereby.

As a result of the above features, after the core is formed by foaming and curing, for example of the polyurethane material, the frame element initially will be formed to be of a bent configuration. This bending will be in a direction opposite to the anticipated direction of warpage due to internal stresses within the frame element. Thereafter, when the frame element is removed from the mold, the internal stresses will cause warping of the initially curved frame element by an extent to achieve transformation of the frame element into a rectilinear configuration, as indicated in FIG. 4.

In the arrangement illustrated it is contemplated that the mold 10 be formed of, for example, aluminum tempered to approximately 50°-60° C. Longitudinal metal members 2, 3 also are contemplated as being of aluminum, and particularly extruded aluminum. However, it is possible in accordance with the present invention to provide longitudinal members of sheet metal, for example produced by known rolling techniques. Furthermore, the longitudinal members may be formed of various plastic materials or be of wood. During curing of the plastic material to form the core 4, such material will become connected to the longitudinal members. This can be achieved by the positive connection of projections 7 illustrated in FIG. 5 or without positive connection simply by bonding of the plastic material to the material of the longitudinal members. Compact or dense zones form on the side walls of the molds that are not covered by the longitudinal members, i.e. upper and lower surfaces illustrated in FIG. 5.

It will be apparent that the degree of curvature of bending ΔL illustrated in FIG. 3 to result in a final frame element of precisely, or at least substantially precisely, rectilinear configuration can be achieved by simple empirical methods. This can be achieved without the necessity of the time consuming and expensive preplanning and simulation necessary in the prior art to achieve coincidence of longitudinal axes of mass of the various components. Thus, in accordance with the present invention it is possible to achieve a straight frame element without regard to the materials of the components, the configurations thereof or the wall thicknesses of the longitudinal members.

The present invention has been described and illustrated with respect to one configuration of a frame element. It is of course to be understood however that such configuration is exemplary only and not in any way limiting to the scope of the present invention. Other configurations of the frame element and the various components thereof clearly are intended to be within the scope of the present invention.

Furthermore, while the present invention has been described and illustrated with respect to other preferred features thereof, it is to be understood that various changes and modifications may be made thereto without departing from the scope of the present invention.

I claim:

1. In an apparatus for the production of a linearly elongated longitudinal multi-component element, said apparatus including a linearly elongated longitudinal mold having therein a linearly elongated longitudinal cavity adapted for receiving at least one substantially linearly elongated longitudinal member forming a first component of the multi-component element and a foamable and curable material which after curing forms a second component of a multi-component element in intimate contact with an secured along its length to the first component, whereby stresses in the first component tend to warp the thus formed multi-component element in a predetermined direction transverse to the length thereof, the improvement comprising:

means for ensuring that the multi-component element will have a linearly elongated configuration free of warpage when removed from said mold, said means comprising bending means for bending said mold, prior to completion of curing of the foamable and curable material, in a direction opposite to said predetermined direction, such that the multi-component element formed within said cavity of said mold will be of a bent configuration, whereby upon removal of the multi-component element from said mold warping of the multi-component element will be compensated by the bent configuration thereof.

2. The improvement claimed in claim 1, wherein said bending means acts at substantially a central location along the length of said mold.

3. The improvement claimed in claim 2, further comprising means for restraining movement of opposite longitudinal ends of said mold.

4. The improvement claimed in claim 3, wherein said bending means comprises a piston cylinder unit.

5. The improvement claimed in claim 3, wherein said bending means comprises a screw spindle unit.

* * * * *